United States Patent
Niizuma

(10) Patent No.: US 9,780,574 B2
(45) Date of Patent: Oct. 3, 2017

(54) WIRELESS POWER SUPPLYING APPARATUS

(71) Applicant: IHI Corporation, Tokyo (JP)

(72) Inventor: Motonao Niizuma, Tokyo (JP)

(73) Assignee: IHI CORPORATION, Tokyo (JP)

(*) Notice: Subject to any disclaimer, the term of this patent is extended or adjusted under 35 U.S.C. 154(b) by 286 days.

(21) Appl. No.: 14/678,054

(22) Filed: Apr. 3, 2015

(65) Prior Publication Data

US 2015/0214751 A1 Jul. 30, 2015

Related U.S. Application Data

(63) Continuation of application No. PCT/JP2013/077222, filed on Oct. 7, 2013.

(30) Foreign Application Priority Data

Oct. 9, 2012 (JP) ................. 2012-224468

(51) Int. Cl.
| | | |
|---|---|---|
| *B60L 1/00* | (2006.01) | |
| *H02J 5/00* | (2016.01) | |
| *B60L 11/18* | (2006.01) | |
| *B60M 7/00* | (2006.01) | |
| *H02J 7/00* | (2006.01) | |

(52) U.S. Cl.
CPC ............ *H02J 5/005* (2013.01); *B60L 11/182* (2013.01); *B60L 11/1833* (2013.01); *B60M 7/003* (2013.01); *H02J 7/0027* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ...... B60L 11/182; B60L 11/1833; H02J 5/005
USPC .......... 307/9.1, 10.1; 320/104, 103, 107–109
See application file for complete search history.

(56) References Cited

U.S. PATENT DOCUMENTS

| | | |
|---|---|---|
| 5,821,731 A | 10/1998 | Kuki et al. |
| 5,850,135 A | 12/1998 | Kuki et al. |
| 2011/0082612 A1 | 4/2011 | Ichikawa |

FOREIGN PATENT DOCUMENTS

| | | | |
|---|---|---|---|
| JP | 09-102329 A | 4/1997 | |
| JP | 2011-217452 A | 10/2011 | |
| JP | 2011217452 A * | 10/2011 | ............ B60L 11/182 |
| WO | 2010/052785 A1 | 5/2010 | |

OTHER PUBLICATIONS

International Search Report, PCT/JP2013/077222, dated Nov. 12, 2013, 1 pg.

* cited by examiner

*Primary Examiner* — Thomas Skibinski
(74) *Attorney, Agent, or Firm* — Volpe and Koenig, P.C.

(57) ABSTRACT

A wireless power supplying apparatus includes: a power-transmitting coil that wirelessly supplies electric power to a power-receiving coil provided in a vehicle; a tire detection unit that detects tires of the vehicle; a moving mechanism that moves the position of the power-transmitting coil; and a control device that controls the moving mechanism on the basis of the detection result of the tire detection unit such that the power-receiving coil and the power-transmitting coil face each other.

2 Claims, 5 Drawing Sheets

WIRELESS POWER SUPPLYING APPARATUS

The present invention relates to a wireless power supplying apparatus.

This application is a Continuation of International Application No. PCT/JP2013/077222, filed on Oct. 7, 2013, claiming priority based on Japanese Patent Application No. 2012-224468, filed on Oct. 9, 2012, the contents of both International Application and the Japanese Application are incorporated herein by reference in their entirety.

TECHNICAL FIELD

Background Art

Patent document 1 discloses an electric vehicle that includes a power-receiving coil which wirelessly receives electric power from a power-transmitting coil provided in a power-supplying device and performs positioning such that the power-receiving coil and the power-transmitting coil squarely face each other. The electric vehicle includes: a camera that captures the image of the outside of the vehicle; and a control device that recognizes the position of the power-transmitting coil on the basis of the image captured by the camera, controls, for example, a driving motor such that the electric vehicle is moved to the power-transmitting coil, estimates the distance between the power-receiving coil and the power-transmitting coil on the basis of the power-receiving state of the power-receiving coil, and controls, for example, the driving motor on the basis of the distance information such that the position of the power-receiving coil is aligned with the position of the power-transmitting coil.

RELATED ART DOCUMENTS

Patent Documents

[Patent Document 1] PCT International Publication No. WO2010/052785

DISCLOSURE OF THE INVENTION

Problems to be Solved by the Invention

In the related art, when the position of the power-receiving coil is aligned with that of the power-transmitting coil which is buried in a stopping area of the road, for example in an intersection, the power-transmitting coil buried under the surface of the road is hidden by the vehicle in front. As a result, the image of the power-transmitting coil is less likely to be captured by the camera. In particular, when the distance between the vehicle and the vehicle in front is short, it is difficult to capture the image of the power-transmitting coil. In the related art, as described above, when the power-transmitting coil is concealed by an obstacle, it is difficult to recognize the power-transmitting coil and thus to align the position of the power-receiving coil with the position of the power-transmitting coil. In addition, in the related art, the control device which controls, for example, the driving motor on the basis of the camera or the image captured by the camera needs to be provided in the vehicle. Therefore, the manufacturing costs of the vehicle are likely to significantly increase.

The invention is made in view of the above-mentioned circumstances and an object of the invention is to provide a technique that is less likely to be affected by an obstacle and can align the position of a power-receiving coil with the position of a power-transmitting coil, without increasing the manufacturing costs of a vehicle.

Means for Solving the Problems

According to a first aspect of the invention, there is provided a wireless power supplying apparatus including: a power-transmitting coil configured to wirelessly supply electric power to a power-receiving coil provided in a vehicle; a tire detector configured to detect tires of the vehicle; a moving mechanism configured to move a position of the power-transmitting coil; and a controller configured to control the moving mechanism on the basis of a detection result of the tire detector such that the power-receiving coil and the power-transmitting coil face each other, in which the tire detector is a pressure sensor provided in a parking space having wheel stoppers, the pressure sensor is provided in each of a plurality of regions dividing the wheel stopper in a direction perpendicular to a traveling direction of the vehicle, and the controller controls a center position of the power-transmitting coil such that a center of the power-transmitting coil deviates from a center line of the parking space in a short-side direction by a sum of half of a difference between a distance from the center line to a right tire of the vehicle and a distance from the center line to a left tire of the vehicle and half of a difference between a distance from a center of the power-receiving coil to the left tire of the vehicle and a distance from the center of the power-receiving coil to the right tire of the vehicle.

Effects of the Invention

According to the invention, the position of the power-transmitting coil is moved on the basis of the detection result of the tire detector that detects the tires of the vehicle such that the power-receiving coil and the power-transmitting coil face each other. Therefore, the wireless power supplying apparatus is less likely to be affected by an obstacle and can align the position of the power-receiving coil with the position of the power-transmitting coil, without increasing the manufacturing costs of the vehicle.

EMBODIMENTS FOR CARRYING OUT THE INVENTION

Hereinafter, an embodiment of the invention will be described with reference to the drawings.

Figure 1:
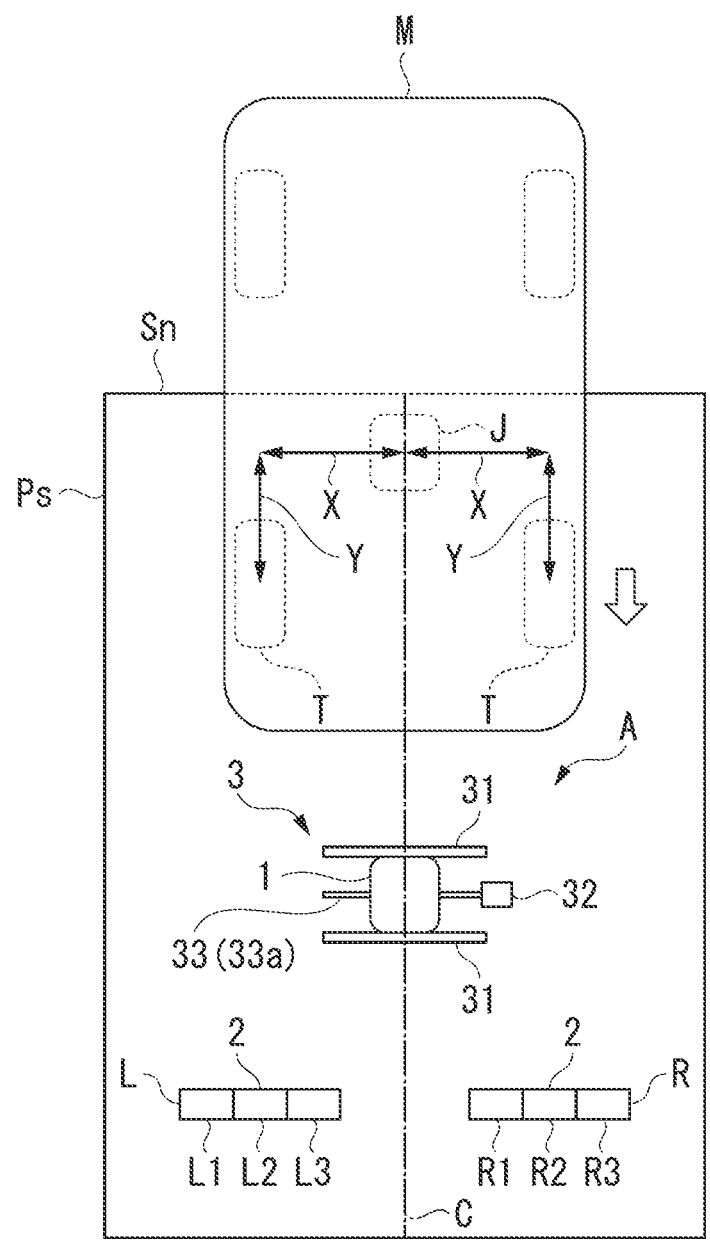
FIG. 1 is a top view showing the schematic structure of a wireless power supplying apparatus according to an embodiment of the invention.
Figure 2:
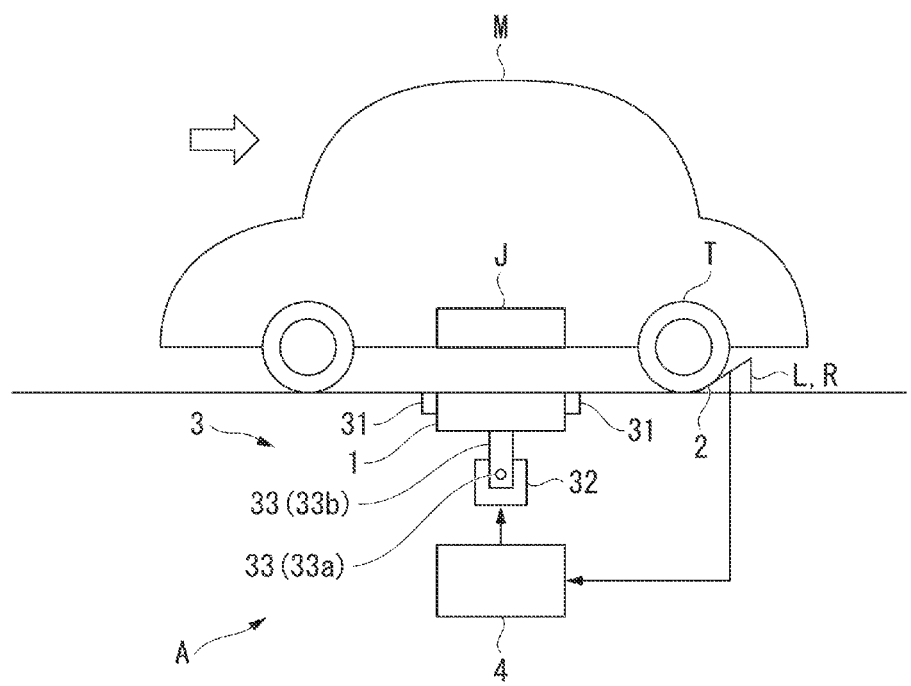
FIG. 2 is a cross-sectional view showing the schematic structure of the wireless power supplying apparatus according to the embodiment of the invention.

As shown in FIGS. 1 and 2, a wireless power supplying apparatus A according to this embodiment includes a power-transmitting coil 1, a tire detection unit 2, a moving mechanism 3, and a control device 4. The wireless power supplying apparatus A wirelessly supplies (feeds) electric power to a vehicle M which is parked in a parking space Ps through the power-transmitting coil 1. The tire detection unit 2 is a tire detector in this embodiment. The control device 4 is a controller in this embodiment.

Figure 3:
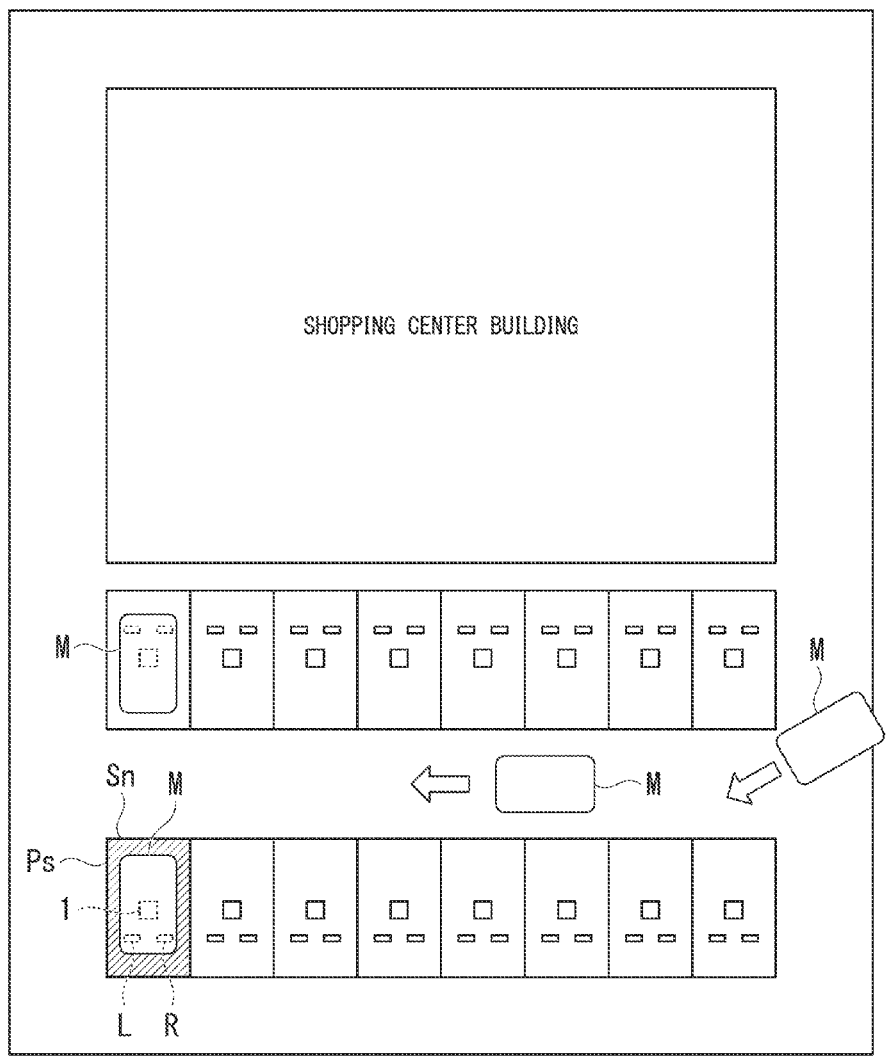
FIG. 3 is a schematic diagram showing an example of installation of the wireless power supplying apparatus according to the embodiment of the invention.

As shown in FIG. 1, the parking space Ps is a rectangular region and has a sufficient size to park one vehicle M. As shown in FIG. 1, in the parking space Ps, one of a pair of short sides is provided as an entrance Sn (exit) for the vehicle M. The vehicle M enters the parking space Ps through the entrance Sn (exit) and drives out of the parking space Ps through the entrance Sn (exit). In addition, in the parking space Ps, a pair of wheel stoppers L and R which stop the rear tires T of the vehicle M are provided on the side opposite to the entrance Sn. As shown in FIG. 1, the pair of wheel stoppers L and R are arranged so as to be symmetric with reference to a center line C of the parking space Ps in a short-side direction and are fixed so as to come into contact with the left and right tires T of the vehicle M while being separated from each other. The wheel stoppers L and R are tall enough to come into contact with the tires T of the vehicle M, but not so tall as to come into contact with the bottom of the vehicle. One parking space Ps may be provided or a plurality of parking spaces Ps may be provided. For example, FIG. 3 shows a case in which a plurality of parking spaces Ps are provided in a parking lot of a shopping center.

The vehicle M charges a battery with electric power which is wirelessly received by a power-receiving coil J from the power-transmitting coil 1 and uses the electric power stored in the battery as a power source of a drive motor. The vehicle M is an electric vehicle or a hybrid vehicle which is driven by a motor that rotates the wheels. The power-receiving coil J is a helical coil with a predetermined coil diameter and is provided in the bottom of the vehicle M such that the axis of the coil is aligned in the vertical direction. The power-receiving coil J has substantially the same coil diameter as the power-transmitting coil 1 which is a ground equipment and is electromagnetically coupled with the power-transmitting coil 1 to wirelessly receive AC power. The power-receiving coil J is provided such that distances X and Y (see FIG. 1) from the tires T in the width direction and the length direction of the vehicle M have predetermined values. In this embodiment, the power-receiving coil J is provided so as to be positioned at the center of the vehicle M in the width direction.

The power-transmitting coil 1 is a helical coil with a predetermined coil diameter and is provided at the center of the parking space Ps in the ground surface. The power-transmitting coil 1 is supplied with AC power with a predetermined frequency from a power-supplying circuit (not shown) and emits the magnetic field (power-supplying magnetic field). The power-transmitting coil 1 is buried in the parking space Ps such that the upper surface of the power-transmitting coil 1 is flush with the surface of the ground, while the axis of the power-transmitting coil 1 is aligned in the up-and-down direction (vertical direction) and the power-transmitting coil 1 is exposed to the parking space Ps or is molded by a non-magnetic material, such as plastic, so that the power-supplying magnetic field is applied to the power-receiving coil J of the vehicle M. The power-transmitting coil 1 is provided so as to be movable in the short-side direction (left-and-right direction) of the parking space Ps by the moving mechanism 3 and is connected to the power-supplying circuit through a movable cable (not shown). In the initial state of the power-transmitting coil 1, the center of the power-transmitting coil 1 is aligned with the center line C.

The tire detection unit 2 is a pressure sensor that detects pressure and includes a switch which is slightly moved or deformed by the pressure and changes its electrical connection state. The tire detection unit 2 is provided in each of a plurality of regions (L1, L2, L3, R1, R2, and R3 in FIG. 1) which divide the wheel stoppers L and R in a direction perpendicular to the traveling direction of the vehicle M and outputs a detection signal indicating the detection result to the control device 4. The control device 4 can determine the regions of the wheel stoppers L and R with which the tires T of the vehicle M come into contact, on the basis of the detection signals received from the tire detection units 2.

The moving mechanism 3 moves the power-transmitting coil 1 in the short-side direction of the parking space Ps on the basis of a control command from the control device 4 and includes guide rails 31, a motor 32, and a ball screw mechanism 33.

The guide rails 31 are a pair of rails which guide the power-transmitting coil 1 in the short-side direction of the parking space Ps (the direction perpendicular to the traveling direction of the vehicle M) and are made of a non-magnetic and non-conductive material, such as resin that does not block the magnetic field generated by the power-transmitting coil 1. The guide rails 31 have length that is equal to or greater than that of the wheel stoppers L and R and are buried in the ground at the center of the parking space Ps along the short-side direction of the parking space Ps. The power-transmitting coil 1 is horizontally moved along the surface of the ground in the parking space Ps while being guided by the guide rails 31. The guide rails 31 may be made of a metal material when a spacer made of a magnetic field transmissive material, such as resin that does not block the magnetic field, is provided between the power-transmitting coil 1 and the guide rails 31 and the guide rails 31 are apart from the power-transmitting coil 1 so as not to block the magnetic field generated by the power-transmitting coil 1.

As shown in FIG. 2, the motor 32 is an electric motor that is connected to one end of a male screw portion 33a of a ball screw mechanism 33, which will be described below, and is rotated on the basis of a motor driving signal supplied from the control device 4 to rotate the male screw portion 33a. The motor 32 may be connected to the male screw portion 33a through, for example, a gear (not shown). When the reduction ratio of the male screw portion 33a is high and the torque of the motor 32 is high, the motor 32 may be connected to the male screw portion 33a, without, for example, a gear.

The ball screw mechanism 33 includes the male screw portion 33a in which a male screw groove is formed in the circumferential surface of a rod-shaped member and a female screw portion 33b in which a female screw groove is formed in a screw hole and which is engaged with the male screw portion 33a. The male screw portion 33a is arranged in parallel to the guide rails 31 and has one end connected to a rotating shaft of the motor 32. The female screw portion 33b is fixed to a rear surface of the power-transmitting coil 1. When the male screw portion 33a is rotated by the motor 32, the ball screw mechanism 33 moves the power-transmitting coil 1 fixed to the female screw portion 33b along the guide rails 31 (in the short-side direction of the parking space Ps), with the rotation of the male screw portion 33a.

The control device 4 controls the overall operation of the wireless power supplying apparatus A and is electrically connected to various control targets including, for example, the tire detection unit 2, the motor 32, and the power-supplying circuit (not shown). The control device 4 controls the moving mechanism 3 on the basis of, for example, a control program which is stored in a non-volatile storage and the detection signal received from the tire detection unit 2, which will be described in detail below.

Next, the operation of the wireless power supplying apparatus A having the above-mentioned structure will be described. Hereinafter, a case in which the vehicle M is backed into the parking space Ps and is stopped will be described.

When the vehicle M is parked in the parking space Ps, the driver backs the vehicle M into the parking space Ps through the entrance of the parking space Ps. When the vehicle M is backed straight into the parking space Ps through the entrance, the rear tires T of the vehicle M come into contact with the wheel stoppers L and R.

When the vehicle M enters the parking space Ps for parking, in the tire detection units 2 of the wireless power supplying apparatus A, the switches of the pressure sensors provided in the regions L1, L2, and L3 and the regions R1, R2, and R3 of the wheel stoppers L and R with which the tires T of the vehicle M come into contact are turned on.

In the wireless power supplying apparatus A, the regions L2 and R2 are central divided regions of the wheel stoppers L and R, respectively. When the tires T come into contact with the regions L2 and R2 of the wheel stoppers L and R, the control device 4 controls the moving mechanism 3 such that the center of the power-transmitting coil 1 is aligned with the center line C. That is, the center line C passes through the center of the power-transmitting coil 1 and extends in a direction parallel to the traveling direction of the vehicle M. The central axes of the central divided regions L2 and R2 of the wheel stoppers L and R also extend in the direction parallel to the traveling direction of the vehicle. The center line C passes through the center between the central axes.

Figure 4A:
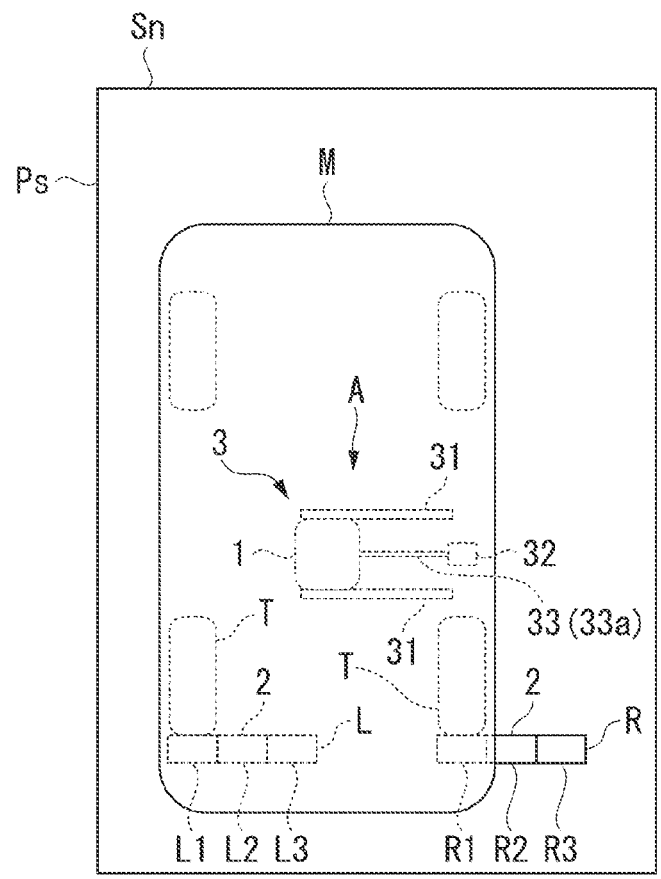
FIG. 4A is a diagram showing an example of operation of the wireless power supplying apparatus according to the embodiment of the invention.

For example, as shown in FIG. 4A, when the tires T come into contact with the regions L1 and R1 of the wheel stoppers L and R and the switches of the tire detection units 2 provided in the regions L1 and R1 are turned on, the control device 4 calculates the average value ((a distance L12+a distance R12)/2) of the distance L12 of the region L1 from the region L2 which is the center region of the wheel stopper L (the distance between the central axis of the region L2 and the central axis of the region L1) and the distance R12 of the region R1 from the region R2 which is the center region of the wheel stopper R (the distance between the central axis of the region R2 and the central axis of the region R1). Then, the control device 4 controls the motor 32 such that the center of the power-transmitting coil 1 is moved to the position corresponding to the average value, that is, where the power-receiving coil J and the power-transmitting coil 1 face each other.

Figure 4B:
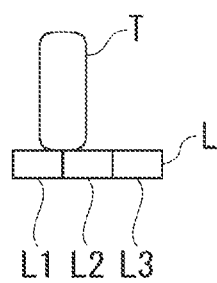
FIG. 4B is a diagram showing an example of operation of the wireless power supplying apparatus according to the embodiment of the invention.

As shown in FIG. 4B, when the left tire T comes into contact with an intermediate portion between the region L1 and the region L2 of the wheel stopper L, the switches of the tire detection units 2 provided in the region L1 and the region L2 are turned on and the control device 4 calculates the distance L12' of the intermediate position between the region L2 and the region L1 from the region L2 (the distance from the central axis of the center region L2 to the central axis of the region L1). At that time, when the right tire T comes into contact with the region R1, the control device 4 calculates the average value of the distance L12' and the distance R12 ((a relative position L12'+a relative position R12)/2) and controls the motor 32 such that the center of the power-transmitting coil 1 is located at the position which deviates from the center line C by the average value of the distances, that is, where the power-receiving coil J and the power-transmitting coil 1 face each other.

When the vehicle is obliquely parked or the tire T comes into contact with only one of the wheel stoppers L and R, the control device 4 performs control such that the power-transmitting coil is aligned with the center line C and is then stopped and does not perform the wireless power supply.

Then, when the vehicle M drives out of the parking space Ps, the driver drives the vehicle M forward and gets out of the parking space Ps through the exit (entrance) of the parking space Ps. When the parked vehicle M drives out of the parking space Ps, the switches of the tire detection unit 2 which comes into contact with the tire T of the vehicle M is turned off in the wireless power supplying apparatus A. When the tire detection unit 2 is turned off, the control device 4 controls the motor 32 such that the center of the power-transmitting coil 1 is aligned with the center line C, that is, the power-transmitting coil 1 is located at the initial position. When the tire detection unit 2 is turned off during the wireless power supply, the control device determines that the vehicle M is intended to drive out of the parking space Ps and stops the wireless power supply.

According to this embodiment, the position of the power-transmitting coil 1 is moved on the basis of the detection result of the tire detection unit 2 which detects the tire T of the vehicle M such that the power-receiving coil J and the power-transmitting coil 1 face each other. Therefore, the wireless power supplying apparatus is less likely to be affected by an obstacle and can align the position of the power-receiving coil J with the position of the power-transmitting coil 1, without increasing the manufacturing costs of the vehicle.

Figure 5:
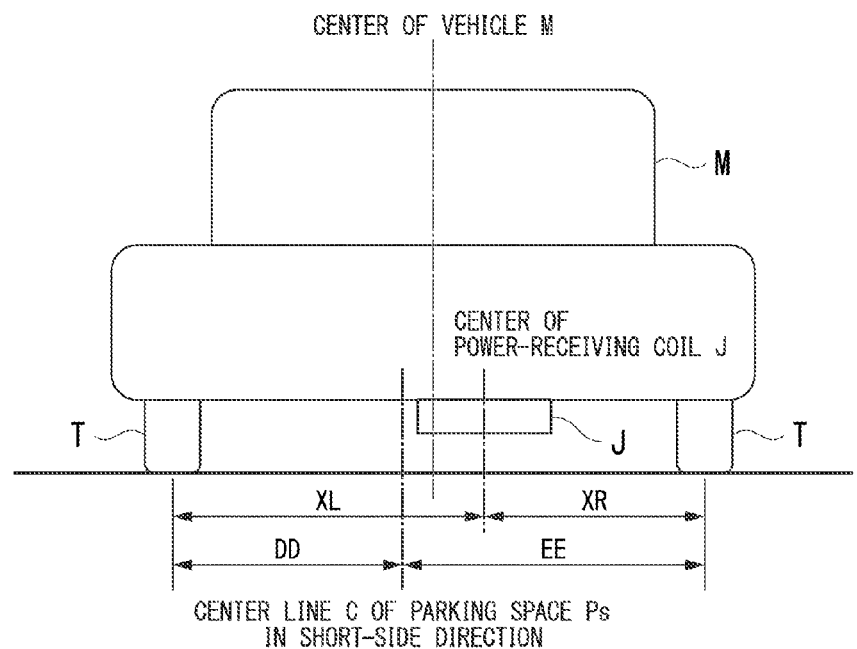
FIG. 5 is a diagram showing a method for calculating the position to which a power-transmitting coil according to the embodiment of the invention is moved.
Figure 5:
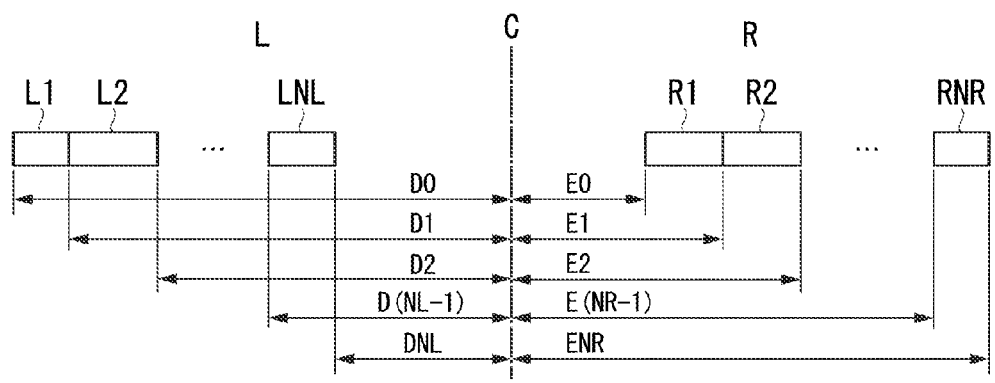

In the description above, the wheel stopper L is divided into three regions L1, L2, and L3 and the wheel stopper R is divided into three regions R1, R2, and R3. The wheel stoppers L and R are arranged so as to be symmetric with reference to the center line C of the parking space Ps in the short-side direction. The power-receiving coil J is provided so as to be positioned at the center of the moving vehicle M in the width direction. However, in a general case, the motor 32 may be controlled such that the center of the power-transmitting coil 1 is located at the following position, which will be described with reference to FIG. 5.

In the rear view of the vehicle M, the distance from the left tire T to the center of the power-receiving coil J is XL and the distance from the right tire T to the center of the power-receiving coil J is XR.

It is assumed that the wheel stopper L is divided into NL regions L1 to LNL and the distances from the center line C to the boundaries between the regions are D0, D1, ..., DNL. D0 indicates the distance from the center line C to the left end of the region L1, D1 indicates the distance from the center line C to the boundary between the regions L1 and L2, and DNL indicates the distance from the center line C to the right end of the region LNL.

It is assumed that the wheel stopper R is divided into NR regions R1 to RNR and the distances from the center line C to the boundaries between the regions are E0, E1, ..., ENR. E0 indicates the distance from the center line C to the left end of the region R1, E1 indicates the distance from the center line C to the boundary between the regions R1 and R2, and ENR indicates the distance from the center line C to the right end of the region RNR.

NL and NR may be equal to or different from each other.

DD is defined as follows on the basis of the region of the wheel stopper L with which the tire T comes into contact (the switch of the tire detection unit which is turned on).

(Case 1) The tire T comes into contact with only one of the regions of the wheel stopper L (only one of the switches of the tire detection unit is turned on):

When the region with which the tire T comes into contact is LX (X is any one of 1 to NL), DD is defined as DD=(D(X−1)+DX)/2, that is, DD is defined as the distance from the center line C to the center of the region LX.

(Case 2) The tire T comes into contact with two adjacent regions among the regions of the wheel stopper L (the switches of two adjacent tire detection units are both turned on):

When the regions with which the tire T comes into contact are LX and L(X+1) (X is any one of 1 to NL−1), DD is defined as DD=DX, that is, DD is defined as the distance from the center line C to the boundary between the regions LX and L(X+1).

Similarly, EE is defined as follows on the basis of the region of the wheel stopper R with which the tire T comes into contact (the switch of the tire detection unit which is turned on).

(Case 1) The tire T comes into contact with only one of the regions of the wheel stopper R (only one of the switches of the tire detection unit is turned on):

When the region with which the tire T comes into contact is RY (Y is any one of 1 to NR), EE is defined as EE=(E(Y−1)+EY)/2, that is, EE is defined as the distance from the center line C to the center of the region RY.

(Case 2) The tire T comes into contact with two adjacent regions among the regions of the wheel stopper R (the switches of two adjacent tire detection units are both turned on):

When the regions with which the tire T comes into contact are RY and R(Y+1) (Y is any one of 1 to NR−1), EE is defined as EE=EY, that is, EE is defined as the distance from the center line C to the boundary between the regions RY and R(Y+1).

The left and right tires T of the vehicle M are symmetrically positioned with respect to the center of the vehicle M. Therefore, the difference between DD and EE indicates the amount of deviation of the vehicle M from the center line C to the left and right sides. Specifically, the center of the vehicle M deviates from the center line C by (EE−DD)/2 (a) (a positive value indicates deviation to the right and a negative value indicates deviation to the left).

The center of the power-receiving coil J deviates from the center of the vehicle M by (XL−XR)/2 (b) (a positive value indicates deviation to the right and a negative value indicates deviation to the left). Therefore, deviation of the power-receiving coil J from the center line C is the sum of (a) and (b), that is, (EE−DD)/2+(XL−XR)/2 (c) (a positive value indicates deviation to the right and a negative value indicates deviation to the left). When the motor 32 is controlled such that the center of the power-transmitting coil 1 deviates from the center line C by (c), the positional relationship in which the power-transmitting coil 1 and the power-receiving coil J face each other, that is, the positional relationship capable of supplying electric power with high efficiency is obtained.

The embodiment of the invention is described above, however, the invention is not limited to the above-mentioned embodiment. For example, the following modifications are considered.

(1) In the above-described embodiment, it is assumed that the vehicle M is backed into the parking space Ps. However, the invention is not limited thereto. That is, when the power-receiving coil J is provided in the vehicle M such that the distances between the power-receiving coil J and the front tires in the width direction and the length direction of the vehicle M have a predetermined value, the vehicle M may be considered to be driven forward into the parking space Ps.

(2) In the above-described embodiment, the power-transmitting coil 1 and the guide rails 31 may protrude from the ground and may be provided over the surface of the ground as long as they have a height that does not hinder the movement of the vehicle M.

(3) When the parking space Ps is exposed to rain or direct sunlight, the entire region in which the power-transmitting coil 1 is movable and the guide rails 31 may be covered or hermetically sealed with a plastic material which is water-resistant, is light-resistant and is transparent to the magnetic field.

(4) The above-described embodiment is provided in the parking space Ps on the ground. However, the above-described embodiment may be provided in a general vehicle support structure, such as a parking space on the second or upper floor of a multi-story parking lot or the upper surface of a pallet of an automated-parking place.

(5) In the above-described embodiment, the ball screw mechanism 33 and the motor 32 are used to move the position of the power-transmitting coil 1. However, the invention is not limited thereto. For example, instead of the ball screw mechanism 33, a general screw may be used. In addition, the motor may be rotated to rotate a pulley and a wire which is wound around the pulley may be rolled or unrolled to move the power-transmitting coil 1 which is connected to the wire. Furthermore, instead of the ball screw mechanism 33 and the motor 32, for example, a hydraulic cylinder or an air cylinder may be used as a moving member to move the position of the power-transmitting coil 1. Instead of the motor 32, which is an electric motor, for example, a hydraulic motor or an air motor may be used as a driving member.

(6) In the above-described embodiment, the pressure sensor is used as the tire detection unit 2. However, the invention is not limited thereto. Instead of the pressure sensor, an optical sensor may be used to detect the tire, for example.

(7) In the above-described embodiment, the magnetic resonance method is used as the wireless power supply method. However, an electromagnetic induction method or other methods may be used.

(8) The power-transmitting coil 1 or the power-receiving coil J is not limited to the helical coil. When wireless power supply can be performed between the power-transmitting coil 1 and the power-receiving coil J, the power-transmitting coil 1 or the power-receiving coil J may have any form or shape, such as a solenoid shape. In addition, the power-transmitting coil 1 and the power-receiving coil J may have different forms, shapes, or sizes.

(9) In the above-described embodiment, the tire detection units 2 are provided in the pair of wheel stoppers L and R. However, the invention is not limited thereto. For example, the tire detection unit 2 may be provided in one of the wheel stoppers L and R and the control device 4 may control the moving mechanism 3 on the basis of a detection signal received from the tire detection unit 2 provided in one of the wheel stoppers L and R.

(10) The pair of wheel stoppers L and R are separately provided on the left and right sides. However, the wheel stopper may also be provided in a portion through which the central axis C passes so that it is seamlessly provided in a line.

(11) The tire according to the invention is not limited to the rubber tire and includes a general wheel for the vehicle which comes into contact with and is rotated on the runway (a road surface or the surface of the ground) on which the vehicle travels.

(12) The tire according to the invention is not limited to the rubber tire and may be members which are symmetrically provided on the left and right sides of the vehicle. For example, the tire may be a bumper, a mud guard, or a warning light. Here, the tire detection unit is provided at a height corresponding to a detection target. For example, when the warning light is to be detected, the tire detection unit is provided at a height which can detect the warning light.

INDUSTRIAL APPLICABILITY

The wireless power supplying apparatus of the invention including the power-transmitting coil which wirelessly supplies electric power to the power-receiving coil provided in the vehicle is less likely to be affected by an obstacle and can align the position of the power-receiving coil with the position of the power-transmitting coil, without increasing the manufacturing costs of the vehicle.

The invention claimed is:

1. A wireless power supplying apparatus comprising:
a power-transmitting coil configured to wirelessly supply electric power to a power-receiving coil provided in a vehicle;
a tire detector configured to detect a plurality of tires of the vehicle;
a moving mechanism configured to move a position of the power-transmitting coil; and
a controller configured to control the moving mechanism on the basis of a detection result of the tire detector such that the power-receiving coil and the power-transmitting coil face each other,
wherein the tire detector is a pressure sensor provided in a parking space having wheel stoppers,
the pressure sensor is provided in each of a plurality of regions dividing the wheel stopper in a direction perpendicular to a traveling direction of the vehicle, and
the controller controls a center position of the power-transmitting coil such that a center of the power-transmitting coil deviates from a center line of the parking space in a short-side direction by a sum of half of a difference between a distance from the center line to a right tire of the vehicle and a distance from the center line to a left tire of the vehicle and half of a difference between a distance from a center of the power-receiving coil to the left tire of the vehicle and a distance from the center of the power-receiving coil to the right tire of the vehicle, and
the controller is configured to stop the moving mechanism when the tire detector detects only one tire out of the plurality of tires.

2. A wireless power supplying apparatus comprising:
a power-transmitting coil configured to wirelessly supply electric power to a power-receiving coil provided in a vehicle;
a tire detector configured to detect a plurality of tires of the vehicle;
a moving mechanism configured to move a position of the power-transmitting coil; and
a controller configured to control the moving mechanism on the basis of a detection result of the tire detector such that the power-receiving coil and the power-transmitting coil face each other, wherein
the controller is configured to stop the moving mechanism when the tire detector detects only one tire out of the plurality of tires.

* * * * *